(12) United States Patent
Kasher et al.

(10) Patent No.: US 10,341,076 B2
(45) Date of Patent: Jul. 2, 2019

(54) MU MIMO BEAMFORMING TRAINING PROTOCOL

(71) Applicant: INTEL CORPORATION, Santa Clara, CA (US)

(72) Inventors: Assaf Kasher, Haifa (IL); Solomon Trainin, Haifa (IL); Carlos Cordeiro, Portland, OR (US); Laurent Cariou, Portland, OR (US); Ou Yang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 15/278,383

(22) Filed: Sep. 28, 2016

(65) Prior Publication Data
US 2018/0091281 A1 Mar. 29, 2018

(51) Int. Cl.
| | |
|---|---|
| *H04L 5/00* | (2006.01) |
| *H04B 17/336* | (2015.01) |
| *H04B 7/0452* | (2017.01) |
| *H04B 7/0456* | (2017.01) |
| *H04B 7/06* | (2006.01) |
| *H04W 72/14* | (2009.01) |
| *H04W 88/08* | (2009.01) |

(52) U.S. Cl.
CPC ......... *H04L 5/0062* (2013.01); *H04B 7/0452* (2013.01); *H04B 7/0456* (2013.01); *H04B 7/0617* (2013.01); *H04B 7/0695* (2013.01); *H04B 17/336* (2015.01); *H04W 72/14* (2013.01); *H04W 88/08* (2013.01)

(58) Field of Classification Search
CPC .... H04B 7/0617; H04B 7/0695; H04B 7/088; H04B 7/0408; H04B 7/0491; H04B 7/0452; H04B 7/0417; H04B 7/0619; H04B 7/0634; H04B 17/336; H04B 7/0456; H04L 5/0062; H04W 72/14; H04W 88/08
See application file for complete search history.

(56) References Cited

U.S. PATENT DOCUMENTS

| | | | |
|---|---|---|---|
| 9,877,350 B2 * | 1/2018 | Abdallah | H04B 7/0617 |
| 2015/0244432 A1 | 8/2015 | Wang | |
| 2015/0289147 A1 | 10/2015 | Lou et al. | |
| 2016/0119043 A1 * | 4/2016 | Rajagopal | H04B 7/063 370/329 |

(Continued)

OTHER PUBLICATIONS

Carlos Cordeiro, Intel, 'Specification Framework for TGay', IEEE 80211-15/01358r5, Aug. 16, 2016, 28 pages.

(Continued)

*Primary Examiner* — Will W Lin
(74) *Attorney, Agent, or Firm* — Alliance IP, LLC

(57) ABSTRACT

In Down Link MU-MIMO, an AP transmits to several STAs concurrently. In the mmWave band, directional transmissions are used so it is necessary for both the AP and the STAs to set their antenna arrays (by setting their antenna weight vectors—AWVs) in the best way to receive the transmissions directed to them by the AP and to avoid interference from transmissions directed to other devices. An exemplary embodiment discloses a beamforming training protocol that is capable of generating a set of antenna weight vectors for MU-MIMO operation that at least improves performance of subsequent communications.

11 Claims, 6 Drawing Sheets

(56) References Cited

U.S. PATENT DOCUMENTS

| | | | |
|---|---|---|---|
| 2016/0190686 A1 | 6/2016 | Gao et al. | |
| 2017/0207839 A1* | 7/2017 | Eitan | H04B 7/0617 |
| 2017/0317727 A1* | 11/2017 | Wang | H04B 7/0452 |
| 2018/0026696 A1* | 1/2018 | Hansen | H04B 7/0617 |
| 2018/0069669 A1* | 3/2018 | Park | H04L 5/001 |
| 2018/0083679 A1* | 3/2018 | Lim | H04B 7/0617 |

OTHER PUBLICATIONS

IEEE Standard for Information technology, 'Telecommunications and information exchange between systems Local and metropolitan area networks Specific requirements, Part 11: Wireless LAN Medium Access Control (MAC) and Physical Layer (PHY) Specifications Amendment 3: Enhancements for Very High Throughput in the 60 GHz Band', Dec. 28, 2012 , 629 pages.

International Search Report and Written Opinion in International Application No. PCT/US2017/048981, dated Dec. 5, 2017, 8 pages.

\* cited by examiner

MU MIMO BEAMFORMING TRAINING PROTOCOL

TECHNICAL FIELD

An exemplary aspect is directed toward communications systems. More specifically an exemplary aspect is directed toward wireless communications systems and even more specifically to IEEE (Institute of Electrical and Electronics Engineers) 802.11 wireless communications systems. Even more specifically, exemplary aspects are at least directed toward one or more of IEEE (Institute of Electrical and Electronics Engineers) 802.11ac/ax/ay communications systems, 60 GHz communications systems, mmWave communications systems, IEEE 802.11TGay communications, MU-MIMO communications systems and in general any wireless communications system or protocol, including WiGig, 4G, 4G LTE, 5G and later, and the like.

BACKGROUND

Wireless networks transmit and receive information utilizing varying techniques and protocols. For example, but not by way of limitation, two common and widely adopted techniques used for communication are those that adhere to the Institute for Electronic and Electrical Engineers (IEEE) 802.11 standards such as the IEEE 802.11n standard, the IEEE 802.11ac standard and the IEEE 802.11ax standard.

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11ax is the successor to 802.11ac and is proposed to increase the efficiency of WLAN networks, especially in high density areas like public hotspots and other dense traffic areas. IEEE 802.11ax also uses orthogonal frequency-division multiple access (OFDMA), and related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

Millimeter wave (mmWave) wireless technology generally corresponds to the portion of the radio spectrum between 30 GHz to 300 GHz, with corresponding wavelengths between one and ten millimeters. For wireless communications, mmWave currently corresponds to bands of spectrum near 38 GHz, 60 GHx and 94 GHz, and in particular to bands between 70 GHz and 90 GH.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
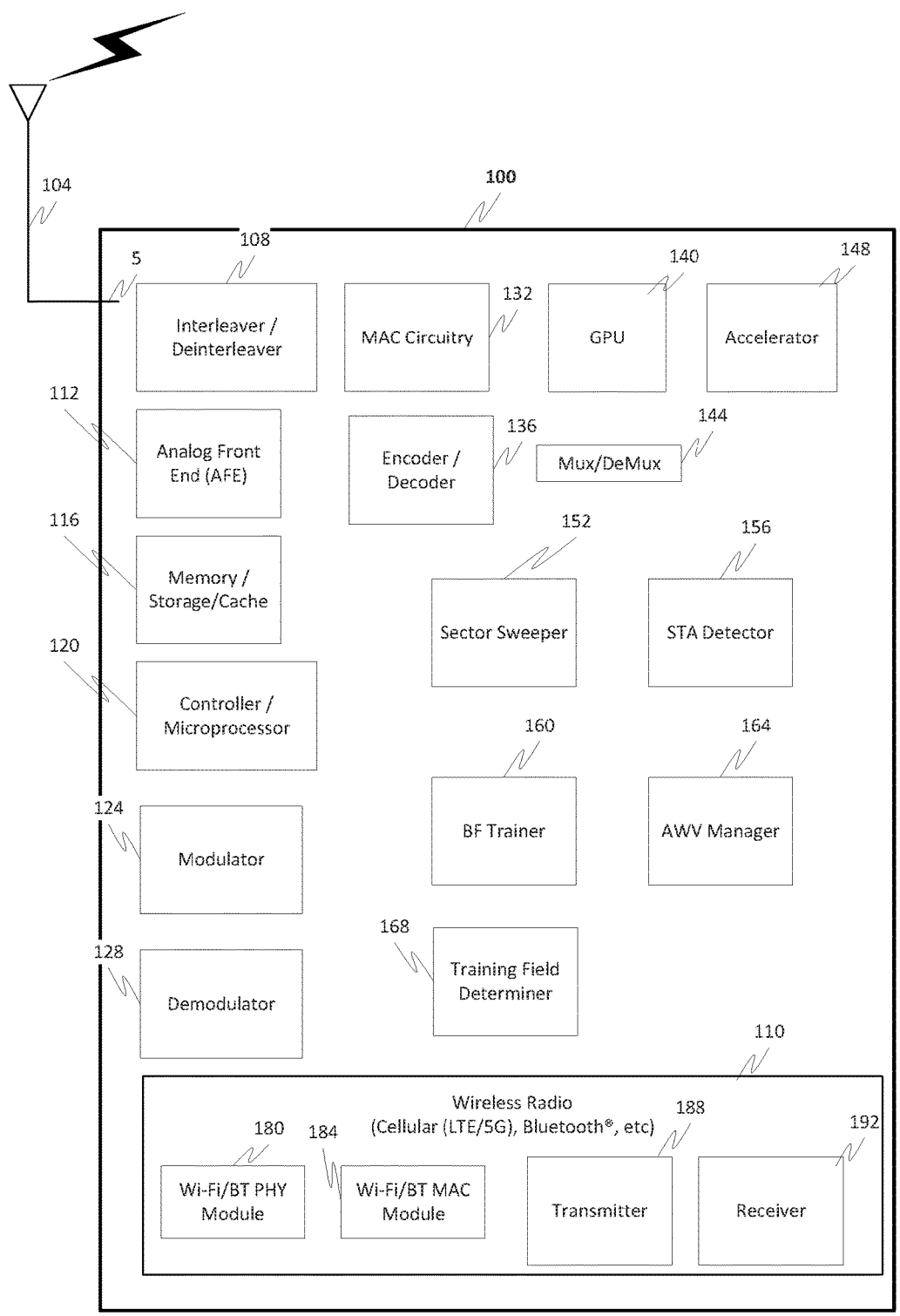
FIG. 1 illustrates an exemplary wireless device (such as station (STA) and/or access point (AP))/circuit configuration.

The IEEE 802.11ay task group provides recommendations for the evolving IEEE 802.11 standard for the mmWave (60 GHz) band. IEEE 802.11ay may use Down Link MU-MIMO (Multi-User Multi-Input Multi-Output) as one of the methods to achieve enhanced throughput through concurrent transmission to multiple devices. Multi-user MIMO (MU-MIMO) is a set of multiple-input and multiple-output technologies for wireless communication, in which a set of wireless devices, each with one or more antennas (which can be multiple element antennas and/or phased arrays), communicate with each other. In contrast, single-user MIMO considers a single multi-antenna transmitter communicating with a single multi-antenna receiver. MU-MIMO is sometimes referred to as space-division multiple access (SDMA); users that are transmitting at the same time and frequency may be separated using their different spatial signatures. In a similar way that OFDMA adds multiple access (multi-user) capabilities to OFDM, MU-MIMO adds multiple access (multi-user) capabilities to MIMO.

In Down Link MU-MIMO, an AP transmits to several STAs concurrently. In the mmWave band, directional transmissions are used so it is necessary for both the AP and the STAs to set their antenna arrays (by setting their antenna weight vectors—AWVs) in the best way to receive the transmissions directed to them by the AP and to avoid interference from transmissions directed to other devices. An exemplary embodiment discloses a beamforming training protocol that is capable of generating a set of antenna weight vectors for MU-MIMO operation.

Antenna weight vectors typically utilize one or more spatial filters to obtain isolation between antennas in a MIMO antenna array. A transceiver (such as an AP) can include devices such as a signal processor that is adapted to output or receive a plurality of distinguishable data streams, such as from one or more stations. A first data stream is associated with a first antenna port connected to a plurality of wideband antennas, while a second data stream is associated with a second antenna port connected to a wideband antenna. The spatial filter assigns antenna weights to the plurality of wideband antennas, which cause the wideband antennas to operate such that wireless signals therefrom are attenuated (at a frequency range in which the wideband transmit radiators radiate) in the direction of the wideband antenna, without attenuating the wireless signals in other directions. By attenuating signals extending between the plurality of wideband antennas and the wideband antenna, wideband decoupling between first and second antenna ports can be accomplished.

At least three exemplary techniques are disclosed for beamforming training:

1) The AP performs a transmit sector sweep with each of the STAs as part of normal (non-MU-MIMO) BF training operation. As a response, each STA returns a set of sectors and corresponding SNR (Signal to Noise) and RSSI (Received Signal Strength Indicator) in which the STA received each sectors sweep frame from the AP.

As part of MU transmission, the AP selects a set of STAs and transmit sector pairs that generate a high SINR (Signal-to-Interference+Noise Ratio) on all the STAs—i.e., each STA is assigned a sector and antenna that was received well by that STA and caused little interference to that STA. This technique can be enhanced further since the sector sweep has been performed with omni RX (omni receive) in the STAs.

As an exemplary enhancement to 1), a new transmit sector sweep is performed (optionally by a BRP packet (Bean Refinement Protocol)), in which each STA is receiving through its best receive AWV (sectors). The best received AWV can be determined from a previous per STA BF training. As a response to the sector sweep, each STA sends the list of received sectors and the SNR at which they were received. The AP then selects a set of STAs and transmit sectors and antennas as discussed above.

2) A procedure similar to 1a) above is performed. Then the AP transmits a BRP packet which has training fields appended to it. The training fields are transmitted through a set of antennas and sectors, each sector directed to a specific STA, allowing all devices to train their respective receive antennas on each of the sectors (optionally including those that are not designated to them). Using this information, each STA modifies its antenna weight vector to increase the SINR between the transmission from antennas and sectors designated for it, and antennas and sectors not designated for it.

3) Procedure 3 is similar to option 2 above, but each STA gets allocated more than one sector and calculates the best AWV and expected performance for each combination. The final calculation is sent to the AP, which then selects the winning set of transmit sectors and antennas.

FIG. 1 illustrates an exemplary hardware/functional block diagram of a device 100, such as a wireless device, mobile device, access point (AP), station (STA), or the like, that is adapted to implement the technique(s) discussed herein.

In addition to well-known componentry (which has been omitted for clarity), the device 100 includes interconnected elements including one or more of: one or more antennas 104 and associated antenna ports, an interleaver/deinterleaver 108, an analog front end (AFE) 112, memory/storage/cache 116, controller/microprocessor 120, MAC circuitry 132, modulator 124, demodulator 128, encoder/decoder 136, GPU 140, accelerator 148, a multiplexer/demultiplexer 144, a sector sweeper 152, s STA detector 156, a BF (beamforming) trainer 160, an AWV manager 164, a training field determiner 168 and wireless radio 110 components such as a Wi-Fi PHY module/circuit 180, a Wi-Fi/BT MAC module/circuit 184, transmitter 188 and receiver 192. The various elements in the device 100 are connected by one or more links/connections 5 (not shown, again for sake of clarity).

The device 100 can have one more antennas 104, for use in wireless communications such as Wi-Fi, multi-input multi-output (MIMO) communications, multi-user multi-input multi-output (MU-MIMO) communications Bluetooth®, LTE, 5G, 60 Ghz, WiGig, mmWave systems, etc. The antenna(s) 104 can include, but are not limited to one or more of directional antennas, omnidirectional antennas, monopoles, patch antennas, loop antennas, microstrip antennas, dipoles, and any other antenna(s) suitable for communication transmission/reception. In one exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 104 generally interact with the Analog Front End (AFE) 112, which is needed to enable the correct processing of the received modulated signal and signal conditioning for a transmitted signal. The AFE 112 can be functionally located between the antenna and a digital baseband system in order to convert the analog signal into a digital signal for processing, and vice-versa.

The device 100 can also include a controller/microprocessor 120 in communication with a memory/storage/cache 116. The device 100 can interact with the memory/storage/cache 116 which may store information and operations necessary for configuring and transmitting or receiving the information and performing one or more portions of the techniques described herein. The memory/storage/cache 116 may also be used in connection with the execution of application programming or instructions by the controller/microprocessor 120, and for temporary or long term storage of program instructions and/or data. As examples, the memory/storage/cache 120 may comprise a computer-readable device, RAM, ROM, DRAM, SDRAM, and/or other storage device(s) and media.

The controller/microprocessor 120 may comprise a general purpose programmable processor or controller for executing application programming or instructions related to the device 100. Furthermore, the controller/microprocessor 120 can cooperate with one or more other elements in the device 100 to perform operations for configuring and transmitting information and performing operations as described herein. The controller/microprocessor 120 may include multiple processor cores, and/or implement multiple virtual processors. Optionally, the controller/microprocessor 120 may include multiple physical processors. By way of example, the controller/microprocessor 120 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 100 can further include a transmitter 188 and receiver 192 which can transmit and receive signals, respectively, to and from other wireless devices and/or access points using the one or more antennas 104. Included in the device 100 circuitry is the medium access control or MAC Circuitry 132. MAC circuitry 132 provides for controlling access to the wireless medium. In an exemplary embodiment, the MAC circuitry 132 may be arranged to contend for the wireless medium and configure frames or packets for communicating over the wireless medium.

The device 100 can also optionally contain a security module (not shown). This security module can contain information regarding but not limited to, security parameters required to connect the device to an access point or other device, or vice versa, or other available network(s), and can include WEP or WPA/WPA-2 (optionally+AES and/or TKIP) security access keys, network keys, etc. As an example, the WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

As shown in FIG. 1, the exemplary device 100 can also include a GPU 140, an accelerator 148, multiplexer/demultiplexer 144, a Wi-Fi/BT/BLE PHY module 180 and a Wi-Fi/BT/BLE MAC module 184 that at least cooperate with one or more of the other components as discussed herein.

Figure 2:
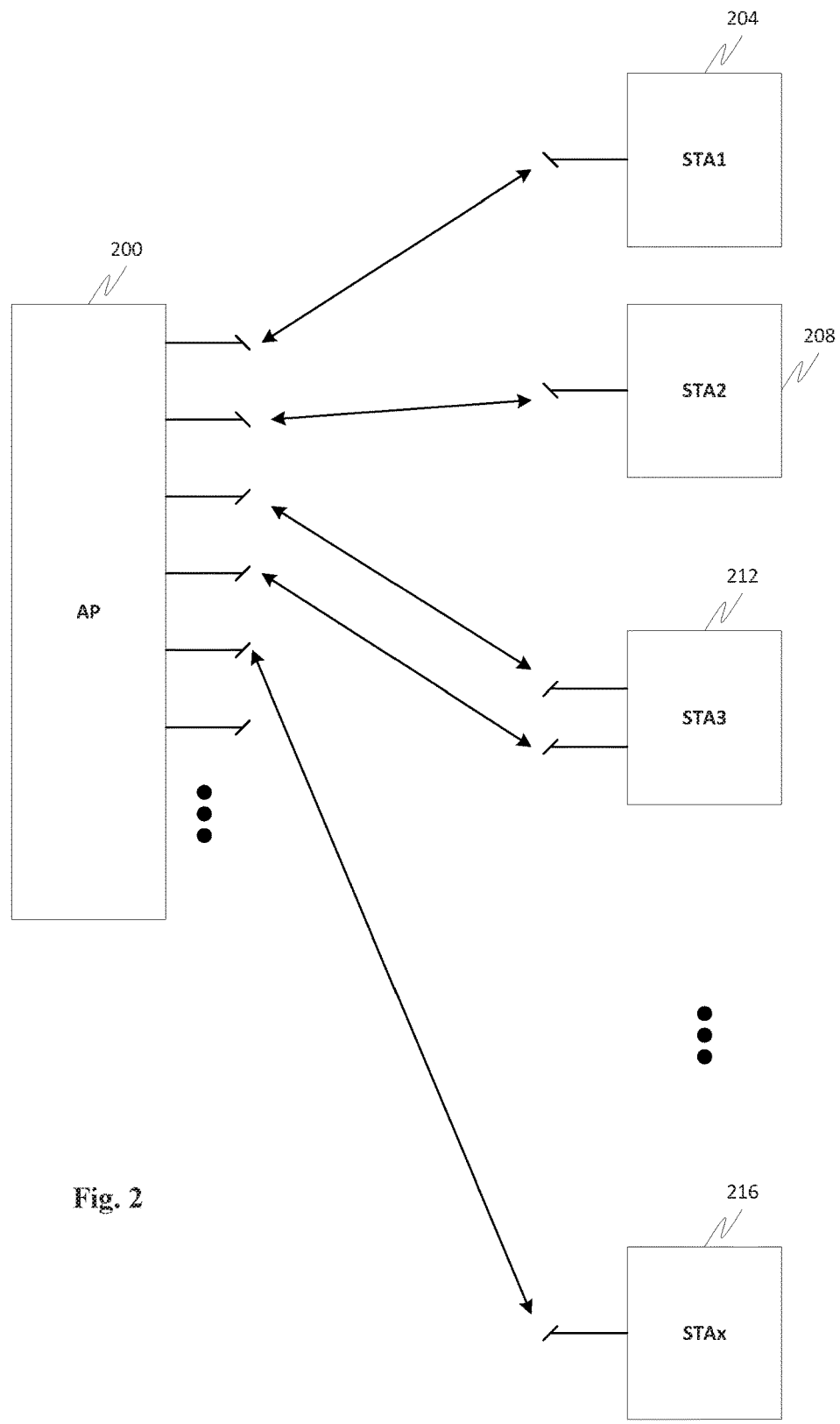
FIG. 2 illustrates an exemplary schematic diagram of an AP and STAs in a down link MU-MIMO scenario.

FIG. 2 shows a schematic diagram of an AP 200 and STAs (204-216) in a down link MU-MIMO scenario. The AP 200 sends data concurrently to all the STAs. A good antenna weight vector (AWV) setting at both the AP 200 and the STAs would increase the ratio between the power of the signals from the AP transmitted to that STA and the power of the signals from the AP 200 to other STAs. To achieve the goal of a good antenna, a beamforming training protocol should be used that provides the AP and STA the information needed to set their AWVs correctly.

Figure 3:
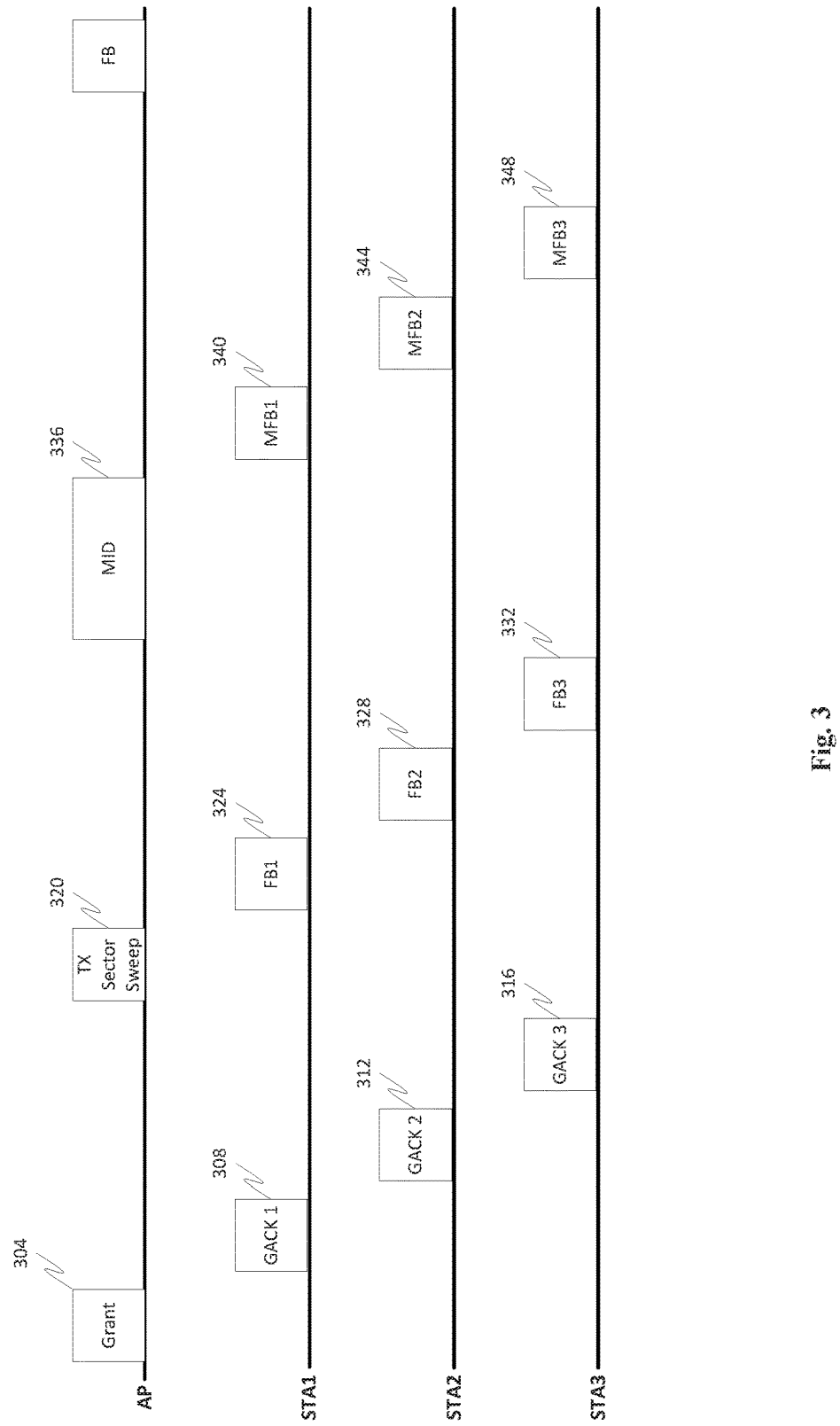
FIG. 3 illustrates an exemplary beamforming protocol according to one embodiment.

FIG. 3 shows a suggested beamforming training protocol in an exemplary embodiment with an AP (such as AP 200) and three stations (such as STAs 204-212), although the technique is generally applicable to any number of APs and STAs).

Figure 4:
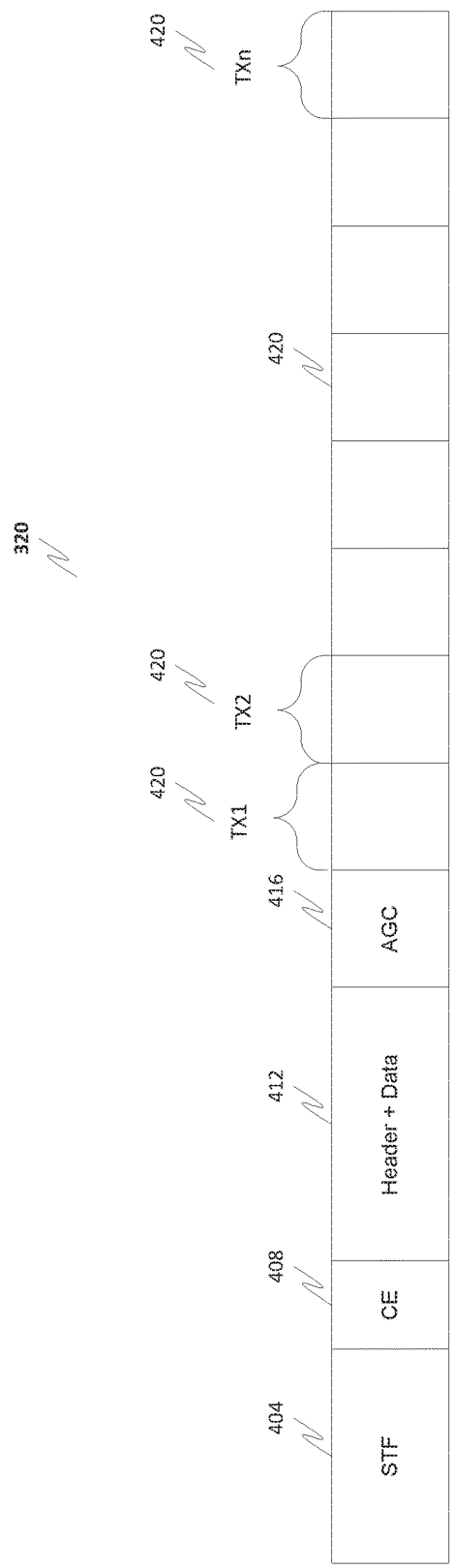
FIG. 4 illustrates an exemplary a sector sweep frame with training fields that can be used with the techniques disclosed herein.

The exemplary protocol starts with the AP 200 sending a Grant frame 304 indicating MU-MIMO training and an order of the STAs as determined by the STA detector 156. The respective STAs reply in the correct order (308-316) and set their AWV (using the AWV manager and processor 120) to the best or preferred AWV for receiving from the AP 200. Then the AP 200 transmits, with the cooperation of the sector sweeper 152 and transmitter 188, a sector sweep frame 320 with training fields (as determined by the BF trainer 160 and training field determiner 168) appended at the end (see exemplary FIG. 4). Each training field is transmitted using a different transmit sector and optionally a different antenna. While the sector sweep frame 320 is shown with fields: short training field 404, CE (channel estimation) field 408, header+data field 412, AGC (automatic gain control) field 416 and a number of training fields 420 (TX1-TXn), it is to be appreciated that the sector sweep can include additional fields or less than the exemplary fields illustrated. For example, the sector sweep frame 320 can include any number of training fields.

The AP 200 can choose between performing the sector sweep with all its transmit sectors or only transmit sectors known to be good for the trained STAs, from a previous AP to STA beamforming training. Each STAs responds with a feedback packet (FB1-FB3, respectively (324-332)), including the list of sectors the respective STA received and the SNR or relative power with which each of them was received. It is to be noted that the sector sweep may optionally be transmitted using different packets per sector, although there may be efficiency impacts.

After the Sector Sweep feedbacks have been received from the STAs at the AP 200, there are 3 exemplary options for continuing:

Option 1:

The AP 200 announces that no MID (as defined in the IEEE 802.11ad standard—Multiple Sector ID detection) will be transmitted. In this case, the AP gathers all the feedback from all the STAs and the AP determines which combination of transmit antenna+sector/STA pairs will generate the best SINR (Signal to Noise+Interference Ratio) at each of the STAs given the current setting of their Rx AWV (as determined by the AWV manager 164). After that, the AP can proceed with down link MU-MIMO beamforming in cooperation with the BF trainer 160.

Figure 5:
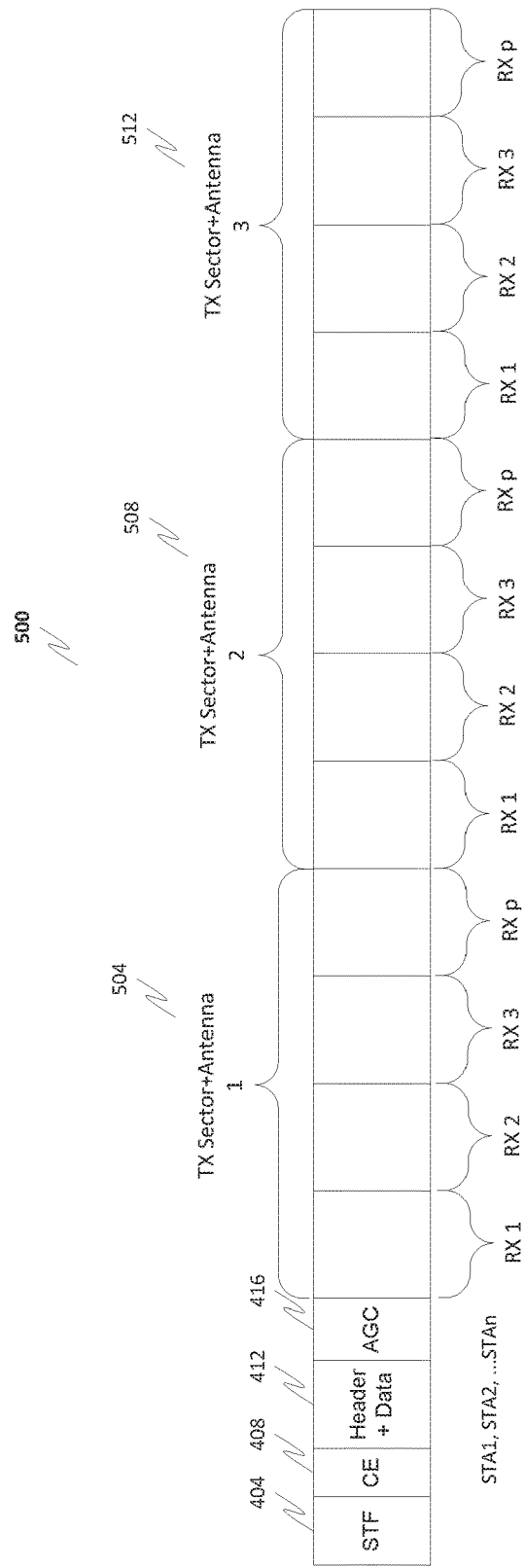
FIG. 5 illustrates an exemplary an exemplary BRP frame within a MID training phase that can be used with the techniques disclosed herein.

Option 2:

The AP transmits a BRP frame 336 as shown in FIG. 5. The exemplary BRP frame 500 for use in the MID training phase in FIG. 5 includes training fields 504-512 appended at the end of the packet. Assume the maximum requested RX training length of all the STAs (sent in the Grant ACKs 308-312) be p. Let the number of STAs be n. The training fields as determined by the training field determiner 168 are transmitted in n groups (504-512) of p training length each. Each group is transmitted using the antenna and the sector that were optimal for a specific STA. Each STA performs RX AWV training using the AWV manager 164 on all the training fields. At the end of the packet, each STA can calculate the RX AWV using the AWV manager 164 that will generate the highest SINR assuming that the AP uses the set of antennas+sectors for transmission to all the STAs. The AP may use the same sectors+antennas for MU-MIMO transmissions.

Option 3:

This option is similar to option 2, but the AP transmits more than one sector per STA. Assume two sectors are transmitted per STA. Now, each STA can calculate 2n combinations of the RX AWV and send an SINR response for each combination as the MID feedback 340-348 (MFB1-3) (Matched Filter Bound) to the AP. The AP can now choose the combination that gives the best combination of SINRs for all STAs.

All of the options may optionally also be extended to cases in which one or more of the STAs are assigned more than one antenna+sectors combination for transmission of more than one spatial stream.

Figure 6:
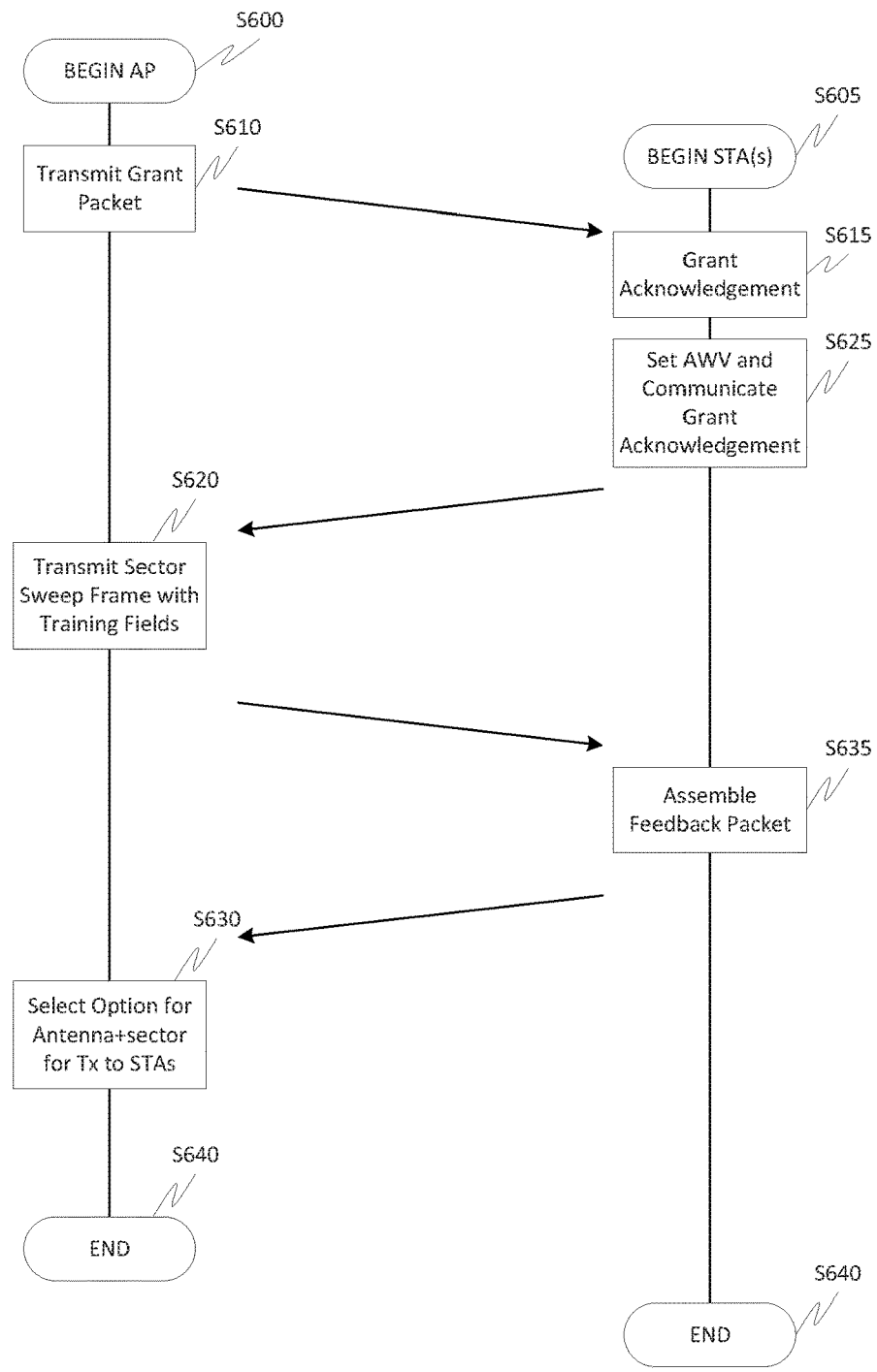
FIG. 6 is a is a flowchart illustrating an exemplary beamforming training protocol.

FIG. 6 illustrates an exemplary improved beamforming training protocol. Control begins in step S600 for the AP and control begins in step S605 for the STAs.

In step S610, the AP transmits a grant frame to the STAs. In step S615, the STAs assemble a grant acknowledgement. Next, the STAs determine and set their AWVs and respond to the AP with a grant acknowledgement. Control then continues to step S620.

In step S620, the AP transmits a sector sweep frame with training fields to the STAs. Next, the STAs assemble and transmit a feedback packet for the AP. With the feedback packet information, the AP selects one of the options discussed above for the antenna+sector selection for communications with the STAs. Control then continues to steps S640 where the control sequence ends.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A wireless communications device comprising:

a transmitter in communication with a processor to determine and transmit a grant frame to one or more stations;

a training field determiner that assembles one or more training fields;

a sector sweeper adapted to communicate with the transmitter and assemble and transmit a sector sweep frame with one or more of the assembled training fields; and a beamforming trainer that receives feedback information from the one or more stations and modifies one or more antenna+sector station pairs at least based on the feedback information.

Any one or more of the above aspects, wherein the processor further determines a signal to noise plus interference ratio.

Any one or more of the above aspects, wherein the training field determiner and transmitter further assemble and transmit a BRP frame having one or more training fields.

Any one or more of the above aspects, wherein the one or more training fields are transmitted in n groups of p training length.

Any one or more of the above aspects, wherein each group is transmitted by the transmitter using an antenna and a sector that are specific for a specific station.

Any one or more of the above aspects, wherein the antenna and the sector are optimized for the specific station.

Any one or more of the above aspects, wherein the transmitter further transmits more than one sector per station and determines, based on MID feedback, a combination of signal to noise plus interference for a plurality of stations.

Any one or more of the above aspects, further comprising one or more connected elements including a receiver, an interleaver/deinterleaver, an analog front end, a GPU, an accelerator, an encoder/decoder, one or more antennas, a processor and memory.

A non-transitory information storage media having stored thereon one or more instructions, that when executed by one or more processors, cause a wireless communications device to perform a method comprising:
  determining and transmitting a grant frame to one or more stations;
  assembling one or more training fields;
  assembling and transmitting a sector sweep frame with one or more of the assembled training fields; and
  receiving feedback information from the one or more stations and modifying one or more antenna+sector station pairs at least based on the feedback information for communication.

Any one or more of the above aspects, further comprising determining a signal to noise plus interference ratio.

Any one or more of the above aspects, further comprising assembling and transmitting a BRP frame having one or more training fields.

Any one or more of the above aspects, wherein the one or more training fields are transmitted in n groups of p training length.

Any one or more of the above aspects, wherein each group is transmitted by a transmitter using an antenna and a sector that are specific for a specific station.

Any one or more of the above aspects, wherein the antenna and the sector are optimized for the specific station.

Any one or more of the above aspects, further comprising transmitting more than one sector per station and determining, based on MID feedback, a combination of signal to noise plus interference for a plurality of stations.

A wireless communications device comprising:
  means for determining and means for transmitting a grant frame to one or more stations;
  means for assembling one or more training fields;
  means for assembling and means for transmitting a sector sweep frame with one or more of the assembled training fields; and
  means for receiving feedback information from the one or more stations and modifying one or more antenna+sector station pairs at least based on the feedback information for communication.

Any one or more of the above aspects, further comprising means for determining a signal to noise plus interference ratio.

Any one or more of the above aspects, further comprising means for assembling and means for transmitting a BRP frame having one or more training fields.

Any one or more of the above aspects, wherein the one or more training fields are transmitted in n groups of p training length.

Any one or more of the above aspects, wherein each group is transmitted by a transmitter using an antenna and a sector that are specific for a specific station.

Any one or more of the above aspects, wherein the antenna and the sector are optimized for the specific station.

Any one or more of the above aspects, further comprising means for transmitting more than one sector per station and means for determining, based on MID feedback, a combination of signal to noise plus interference for a plurality of stations.

A method of operating a wireless communications device comprising:
  determining and transmitting a grant frame to one or more stations;
  assembling one or more training fields;
  assembling and transmitting a sector sweep frame with one or more of the assembled training fields; and
  receiving feedback information from the one or more stations and modifying one or more antenna+sector station pairs at least based on the feedback information for communication.

Any one or more of the above aspects, further comprising determining a signal to noise plus interference ratio.

Any one or more of the above aspects, further comprising assembling and transmitting a BRP frame having one or more training fields.

Any one or more of the above aspects, wherein the one or more training fields are transmitted in n groups of p training length.

Any one or more of the above aspects, wherein each group is transmitted by the transmitter using an antenna and a sector that are specific for a specific station.

Any one or more of the above aspects, wherein the antenna and the sector are optimized for the specific station.

Any one or more of the above aspects, wherein the transmitter further transmits more than one sector per station and determines, based on MID feedback, a combination of signal to noise plus interference for a plurality of stations.

A method of operating a wireless communications device comprising:
  receiving a grant frame;
  setting one or more antenna weight vectors;
  communicating a grant acknowledgement to another wireless device;
  receiving a sector sweep frame with one or more of training fields; and
  assembling and transmitting feedback information to be used for modifying one or more antenna+sector station pairs for communication.

Any one or more of the above aspects, further comprising determining one or more of a signal to noise plus interference ratio and a signal to noise ratio for each received sector sweep frame.

Any one or more of the above aspects, further receiving a BRP frame having one or more training fields.

Any one or more of the above aspects, wherein the one or more training fields are received in n groups of p training length.

Any one or more of the above aspects, wherein each group is received using an antenna and a sector that are specific for a specific station.

Any one or more of the above aspects, wherein the antenna and the sector are optimized for the specific station.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless device of an access point (AP) including a memory, and a microprocessor coupled to the memory and configured to:
   generate and cause transmission of a millimeter-wave (mmWave) frame to a plurality of stations (STAs), the mmWave frame to indicate an order in a time domain for communication with the AP by respective ones of the STAs;
   generate and cause transmission, after causing transmission of the mmWave frame indicating the order, of a mmWave sector sweep (SSW) frame to respective ones of the STAs as part of a beamforming training with the STAs;
   process feedback for the mmWave SSW frame from at least some of the STAs;
   select a transmit antenna and transmit antenna sector of the AP at least based on the feedback for the mmWave SSW frame;
   implement beam refinement after the feedback for the mmWave SSW frame by causing transmission of a mmWave beam refinement protocol (BRP) frame;
   cause, during beam refinement, mmWave transmissions to the STAs using a plurality of transmit sectors of the AP; and
   process feedback for the mmWave transmissions from at least some of the STAs including information based on receive antenna weight vectors (AWVs), the AWVs corresponding to respective sectors of the at least some of the STAs, wherein the mmWave transmissions and the feedback for the mmWave transmissions are to occur in a Multiple Sector ID training phase of the beam refinement.

2. The device of claim 1, wherein the feedback for the mmWave SSW frame is based on the order.

3. The device of claim 1, further including the transmit sectors of the AP, wherein each of the transmit sectors of the AP includes a plurality of antennas.

4. The device of claim 3, further comprising interconnected elements including one or more of: antenna ports connected to the transmit sectors of the AP, and an analog front end.

5. A product comprising one or more tangible computer-readable non-transitory storage media comprising computer-executable instructions operable to, when executed by at least one computer processor, enable the at least one computer processor to implement operations at a wireless communication device of an access point (AP), the operations comprising:
   generating and cause transmission of a millimeter-Wave (mmWave) frame to a plurality of stations (STAs), the mmWave frame to indicate an order in a time domain for communication with the AP by respective ones of the STAs;
   generating and cause a mmWave transmission, after causing transmission of the mmWave frame indicating the order, of a sector sweep (SSW) frame to respective ones of the STAs as part of a beamforming training with the STAs;
   processing feedback for the SSW frame from at least some of the STAs;
   selecting a transmit antenna and transmit antenna sector of the AP at least based on the feedback for the SSW frame;
   implementing beam refinement after the feedback for the SSW frame by causing transmission of a mmWave beam refinement protocol (BRP) frame;
   causing, during beam refinement, mmWave transmissions to the STAs using a plurality of transmit sectors of the AP; and
   processing feedback for the mmWave transmissions from at least some of the STAs including information based on receive antenna weight vectors (AWVs), the AWVs corresponding to respective sectors of the at least some of the STAs, wherein the mmWave transmissions and the feedback for the mmWave transmissions are to occur in a Multiple Sector ID training phase of the beam refinement.

6. The product of claim 5, wherein the feedback for the SSW frame is based on the order.

7. A wireless communication device of an access point (AP), the device including:
   a circuit for generating and causing transmission of a millimeter-wave (mmWave) frame to a plurality of stations (STAs), the mmWave frame to indicate an order in a time domain for communication with the AP by respective ones of the STAs;
   a circuit for generating and causing transmission, after causing transmission of the mmWave frame indicating the order, of a mmWave sector sweep (SSW) frame to respective ones of the STAs as part of a beamforming training with the STAs;
   a circuit for processing feedback for the mmWave SSW frame from at least some of the STAs; and
   a circuit for selecting a transmit antenna and transmit antenna sector of the AP at least based on the feedback for the mmWave SSW frame;
   a circuit for implementing beam refinement after the feedback for the mmWave SSW frame by causing transmission of a mmWave beam refinement protocol (BRP) frame;
   a circuit for causing, during beam refinement, mmWave transmissions to the STAs using a plurality of transmit sectors of the AP; and
   a circuit for processing feedback for the mmWave transmissions from at least some of the STAs including information based on receive antenna weight vectors (AWVs), the AWVs corresponding to respective sectors of the at least some of the STAs, wherein the mmWave transmissions and the feedback for the mmWave transmissions are to occur in a Multiple Sector ID training phase of the beam refinement.

8. The device of claim 7, wherein the feedback for the mmWave SSW frame is based on the order.

9. A wireless device of a station (STA) including a memory, and a microprocessor coupled to the memory and configured to:

process a millimeter-wave (mmWave) frame from an access point (AP) addressed to a plurality of stations (STAs), the mmWave frame to indicate an order in a time domain for communication with the AP by respective ones of the STAs;

after processing the mmWave frame, process a mmWave sector sweep (SSW) frame addressed to respective ones of the STAs as part of a beamforming training with the STAs;

generate and cause transmission of feedback for the mmWave SSW frame based on the order in the time domain;

communicate using a transmit antenna and transmit antenna sector of the STA at least based on the feedback for the mmWave SSW frame;

implement beam refinement after the feedback for the mmWave SSW frame by processing a mmWave beam refinement protocol (BRP) frame from the AP;

process, during beam refinement, mmWave transmissions from the AP through a plurality of transmit sectors of the AP; and generate and cause transmission of feedback for the mmWave transmissions, the feedback for the mmWave transmissions including information based on receive antenna weight vectors (AWVs) of the STA determined as a result of the mmWave transmissions, wherein the mmWave transmissions and the feedback for the mmWave transmissions are to occur in a Multiple Sector ID training phase of the beam refinement.

10. The device of claim 9, further comprising interconnected elements including one or more of: antenna ports to be connected to the sector of the STA, and an analog front end.

11. A product comprising one or more tangible computer-readable non-transitory storage media comprising computer-executable instructions operable to, when executed by at least one computer processor, enable the at least one computer processor to implement operations at a wireless communication device of a station (STA), the operations comprising:

processing a millimeter-wave (mmWave) frame from an access point (AP) addressed to a plurality of stations (STAs), the mmWave frame to indicate an order in a time domain for communication with the AP by respective ones of the STAs;

after processing the mmWave frame, processing a mmWave sector sweep (SSW) frame addressed to respective ones of the STAs as part of a beamforming training with the STAs;

generating and cause transmission of feedback for the mmWave SSW frame based on the order in the time domain;

communicating using a transmit antenna and transmit antenna sector of the STA at least based on the feedback for the mmWave SSW frame;

implementing beam refinement after the feedback for the mmWave SSW frame by processing a mmWave beam refinement protocol (BRP) frame from the AP;

processing, during beam refinement, mmWave transmissions from the AP through a plurality of transmit sectors of the AP; and generating and causing transmission of feedback for the mmWave transmissions, the feedback for the mmWave transmissions including information based on receive antenna weight vectors (AWVs) of the STA determined as a result of the mmWave transmissions, wherein the mmWave transmissions and the feedback for the mmWave transmissions are to occur in a Multiple Sector ID training phase of the beam refinement.

* * * * *